(12) United States Patent
Boisdevesys et al.

(10) Patent No.: US 10,429,953 B2
(45) Date of Patent: Oct. 1, 2019

(54) MANUAL DEVICE COMPRISING REVERSIBLE TIP FOR A CAPACITIVE SCREEN

(71) Applicant: SOCIETE BIC, Clichy (FR)

(72) Inventors: David Boisdevesys, Vitry sur Seine (FR); Arnaud Bez, Garches (FR); Etienne Roudaut, Paris (FR)

(73) Assignee: SOCIETE BIC, Clichy (FR)

( * ) Notice: Subject to any disclaimer, the term of this patent is extended or adjusted under 35 U.S.C. 154(b) by 335 days.

(21) Appl. No.: 14/893,978

(22) PCT Filed: May 28, 2014

(86) PCT No.: PCT/FR2014/051255
§ 371 (c)(1),
(2) Date: Nov. 25, 2015

(87) PCT Pub. No.: WO2014/191680
PCT Pub. Date: Dec. 4, 2014

(65) Prior Publication Data
US 2016/0116999 A1    Apr. 28, 2016

(30) Foreign Application Priority Data
May 29, 2013    (FR) ..................................... 13 54874

(51) Int. Cl.
G09G 5/00       (2006.01)
G06F 3/0354     (2013.01)
G06F 3/044      (2006.01)

(52) U.S. Cl.
CPC .......... *G06F 3/03545* (2013.01); *G06F 3/044* (2013.01)

(58) Field of Classification Search
CPC ....... G06F 3/044; G06F 3/016; G06F 3/03545
(Continued)

(56) References Cited

U.S. PATENT DOCUMENTS 7,066,673 B1    6/2006  Kuo
8,576,203 B2    11/2013 Nakata et al.
(Continued)

FOREIGN PATENT DOCUMENTS

CN    2754896 Y     2/2006
CN    200988363 Y   12/2007
(Continued)

OTHER PUBLICATIONS

International Search Report dated Aug. 13, 2014 from corresponding PCT/FR2014/051255, 7 pages.
(Continued)

*Primary Examiner* — Jennifer T Nguyen
(74) *Attorney, Agent, or Firm* — Ohlandt, Greeley, Ruggiero & Perle, L.L.P.

(57) ABSTRACT

A manual device comprising a body, comprising at least one reversible tip mounted on the body, the reversible tip comprising a first head and a second head opposite to the first head, the tip being configured to be mounted on the body in a first position in which the first head projects from the body while the second head is stored inside the body or in a second position in which the second head projects from the body while the first head is stored inside the body, the first head comprising a first pad for a capacitive screen.

10 Claims, 3 Drawing Sheets

(58) Field of Classification Search
USPC .................................................. 345/179, 174
See application file for complete search history.

(56) References Cited

U.S. PATENT DOCUMENTS

| | | | |
|---|---|---|---|
| 9,195,351 B1* | 11/2015 | Rosenberg | G06F 1/1626 |
| 2004/0154172 A1 | 8/2004 | Tatz | |
| 2005/0212780 A1 | 9/2005 | Tokkonen | |
| 2005/0279231 A1* | 12/2005 | Lee | B44B 5/0085 101/3.1 |
| 2011/0094804 A1* | 4/2011 | Liang | G06F 3/03545 178/19.01 |
| 2011/0304577 A1 | 12/2011 | Brown et al. | |
| 2011/0316815 A1* | 12/2011 | Fang | G06F 3/03545 345/179 |
| 2012/0039662 A1 | 2/2012 | Zhang et al. | |
| 2012/0154340 A1 | 6/2012 | Vuppu et al. | |
| 2012/0194484 A1 | 8/2012 | Lehman | |
| 2012/0262429 A1 | 10/2012 | Hsu et al. | |
| 2013/0194242 A1* | 8/2013 | Park | G06F 3/03545 345/179 |
| 2013/0322952 A1 | 12/2013 | Zhang et al. | |
| 2014/0028636 A1* | 1/2014 | Zhang | G06F 3/033 345/179 |
| 2014/0125606 A1* | 5/2014 | Namkung | G06F 1/1656 345/173 |
| 2016/0216786 A1* | 7/2016 | Rolion | B43K 29/00 |
| 2017/0329422 A1 | 11/2017 | Malinverni et al. | |

FOREIGN PATENT DOCUMENTS

| | | |
|---|---|---|
| CN | 201304798 | 9/2009 |
| CN | 201773366 | 3/2011 |
| CN | 201970658 U | 9/2011 |
| CN | 202177872 U | 3/2012 |
| CN | 102902380 A | 1/2013 |
| CN | 202711186 | 1/2013 |
| CN | 202838204 | 3/2013 |
| GB | 2496381 A | 5/2013 |
| JP | 63-282516 A | 11/1988 |
| JP | 3171232 U | 10/2011 |
| JP | 2012-128486 A | 7/2012 |
| JP | 2012-226554 A | 11/2012 |
| KR | 10-2010-0125631 | 12/2010 |
| WO | 20121094633 A1 | 7/2012 |
| WO | 2012103323 A1 | 8/2012 |

OTHER PUBLICATIONS

Chinese Office Action dated Dec. 25, 2017 from corresponding Chinese Patent Application 2014800310025, 11 pages.
Japanese Office Action dated Jan. 25, 2018 from corresponding Japanese Patent Application 2016-516224, 6 pages.
International Search Report dated Feb. 10, 2016 from corresponding International Patent Application PCT/FR2015/053111, 5 pages.
Second Chinese Office Action dated Dec. 5, 2018 in corresponding Chinese Patent Application No. 2014800310025, 11 pages.
First Chinese Office Action dated Jul. 17, 2016 in related patent application No. CN201580062563.6, 13 pages.

* cited by examiner

MANUAL DEVICE COMPRISING REVERSIBLE TIP FOR A CAPACITIVE SCREEN

BACKGROUND OF THE DISCLOSURE

1. Field of the Disclosure

The invention relates to a manual device having a tip for a capacitive screen. Such a tip for a capacitive screen is capable of interfering/interacting with the capacitive screen in such a manner that its presence at a given point of said capacitive screen can be detected by the screen. By way of example, the capacitive screen is a screen of a multi-media tablet or of a mobile telephone screen.

2. Description of the Related Art

In order to use a capacitive screen, a stylus for a capacitive screen is often necessary. Nevertheless, such a stylus is a specific instrument presenting a single head for a predetermined capacitive screen, and is expensive.

SUMMARY OF THE DISCLOSURE

The object of the present invention is to remedy the above-mentioned drawbacks, at least substantially.

The invention achieves this object by providing a manual device comprising a body and at least one reversible tip mounted on the body, the reversible tip comprising a first head and a second head opposite to the first head, the tip being configured to be mounted on the body in a first position in which the first head projects from the body while the second head is stored inside the body or in a second position in which the second head projects from the body while the first head is stored inside the body, the first head comprising a first pad for a capacitive screen. Advantageously, the manual device forms an office device (or office accessory), such as for example a stylus, a pen, a mechanical pencil, or the equivalent.

It should be understood that, when the tip is mounted on the body in the first position, the first head is usable, whereas when the tip is mounted on the body in the second position, the second head is usable. When one head is usable, the other head is arranged inside the body. In other words, the body is at least partially hollow and is configured to receive the first or the second head respectively in the second or first position of the tip. Thus, the body makes it possible "to stow" one head when the other head is usable. The body is used to protect the head stowed in that way. In the meaning of the invention, the term "body" generally refers to the combination of all of the elements that do not form part of the tip.

It can be understood that the pad is a termination configured to interact with a capacitive screen. The pad is electrically conductive (because of the material from which it is made, or because of a coating). The shape, the flexibility/stiffness, and the material(s) of a pad are not limited, providing the pad is capable of interacting with a capacitive screen, i.e. providing the screen can detect it making contact therewith.

All or part of the body forms a prehension portion of the manual device. The tip is configured so that the user can mount it on the body in the first or second position. Thus, depending on the choice of the user, the tip may be mounted on the body in the first or second position, and the manual device may be used by manipulating it via the body in order to use the head as selected in this way that is projecting from the body.

Since the tip has two heads, the first head comprising a pad for a capacitive screen, the manual device may be used with a capacitive screen with the first head, while the second head enables the manual device to be used by way of example in other circumstances (e.g. to erase, if the second head carries an eraser).

Thus, the manual device is more general-purpose, or less specific, than the known devices of the prior art. Such a manual device forms a "two-in-one" device, presenting two "tools" in just one device. The overall cost of such a device is less than the combined cost of two distinct conventional devices each forming a "tool" equivalent to one of the heads.

Advantageously, the second head comprises a second pad for a capacitive screen.

It should be understood that the second pad is distinct from the first pad. Preferably, the second pad is different from the first pad. By way of example, the first and second pads differ in their size and/or contact area with a capacitive screen, and/or shape, and/or materials, and/or stiffness, etc.

The manual device thus presents two distinct pads making it possible to use different capacitive screens. The versatility of the manual device for using capacitive screens is thus increased. By way of example, the contact areas of the first and second pads are adapted to capacitive screens presenting varying degrees of precision. Thus, by way of example, the pad having the greatest contact area is used with the capacitive screen of a multi-media tablet, while the pad having the smaller contact area is used with the capacitive screen of a mobile telephone, the screen of a multi-media tablet generally being less precise than the screen of a mobile telephone.

Advantageously, the first pad is in electrical contact with at least a portion of the body when the tip is mounted in the first position.

Advantageously, the second pad is in electrical contact with at least a portion of the body when the tip is mounted in the second position.

The term "at least a portion of the body" refers to any part of the manual device not forming part of the tip. By way of example, this part is an outside part of the manual device, e.g. a prehension portion, or an inside part of the manual device.

The electrical contact between the first/second pad and the body, or a portion of the body, may be direct or indirect. Thus, in a variant, the first/second pad is in direct contact with a portion of the body. In another variant, the first/second pad is in electrical contact with the body or with a portion of the body via an intermediate part.

Such electrical contact makes it possible to ensure that a capacitive screen is sensitive to the presence of the first/second pad when the user manipulates the manual device by hand and moves said pad closer to the capacitive screen.

Advantageously, the body presents at least one conductive portion, the first/second pad being in electrical contact with at least the conductive portion of the body when the tip is mounted in the first/second position.

Below, and unless specified to the contrary, the term "conductive" should be understood as "capable of conducting electricity". Conversely, below, and unless specified to the contrary, the term "insulating" should be understood as "insulating relative to electricity".

In a variant, the conductive portion is a prehension portion of the body. In another variant, the conductive portion is an inside portion of the body (i.e. that is not intended to be directly held by the hand of a user), e.g. an internal conductive rod. In yet another variant, the body has an internal conductive portion and a conductive prehension portion.

Advantageously, the tip comprises at least one contact member (or first contact member) configured to form an electrical contact between the tip and at least a portion of the body when the tip is mounted in the first position.

Advantageously, the tip comprises at least one contact member (or second contact member) configured to form an electrical contact between the tip and at least a portion of the body when the tip is mounted in the second position.

The first and second contact members may form a single body, or they may form two distinct members.

It should be understood that a contact member is an element that makes it possible to form an electrical contact between the tip and at least a portion of the body. In a variant, such a contact member forms a single part together with the tip. In another variant, such a member forms a part that is distinct from the tip.

By means of such a contact member, it is easier to put the first/second pad into electrical contact with at least a portion of the body when the tip is mounted in the first/second position.

Advantageously, the tip comprises a conductive casing in which the first head and/or the second head is/are fitted.

It should be understood that the casing has an internal housing receiving the first head and/or the second head. Since the casing is conductive, e.g. made of metal, electrical contact can be easily established firstly between the first head and/or the second head and the casing, and secondly between the casing and at least a portion of the body.

Advantageously, the casing extends in an axial direction, and a head selected from the first head and the second head co-operates with a first shoulder axially defining a first axial casing portion and a second axial casing portion, said head extending in the first axial casing portion by projecting from the casing.

In the axial direction, the casing presents a first portion and a second portion. The first and second portions of the casing are separated by a first shoulder. One of the two heads is mounted by fitting in the casing, and more particularly in the first axial casing portion, and co-operates with the first shoulder, e.g. in abutment or pressing thereagainst. Such assembly makes it possible to establish electrical contact easily between said head and the casing.

Advantageously, said head includes a base forming a shoulder co-operating with the first shoulder in such a manner as to establish electrical contact between said head and the casing.

The base includes the portion of said head that is configured to co-operate with the first shoulder. By way of example, the base is conductive and co-operates with the first shoulder by pressing thereagainst. Since the casing is also conductive, electrical contact is thus established. In a variant, the base is not conductive but presents at least one contact portion that co-operates with the first shoulder, or an additional contact portion of the first shoulder. In another variant, the base is conductive and presents at least one contact portion.

Advantageously, the base is blocked between the first shoulder and the other head selected from the first head and the second head.

The base comprises a portion of the first head that is sandwiched between the first shoulder and the second head. Such assembly makes it possible to ensure simple and effective mechanical mounting of the first head on the casing while ensuring electrical contact. Advantageously, by locking the other head in the casing, e.g. by engaging it by force in the casing, the assembly of the two heads with the casing is locked.

Advantageously, the other head selected from the first head and the second head includes a support and a pad for a capacitive screen, said pad being mounted on the support in such a manner as to be in electrical contact with the casing.

It should be understood that the support and the pad form two distinct parts. When said other head is the first head, then said pad is the first pad. When said other head is the second head, then said pad is the second pad. Contact between the pad and the casing may be direct, with the pad physically touching the casing, or indirect, e.g. via the support. Preferably, the pad is in direct contact with the casing. This makes it possible to limit the number of contacts between distinct parts, which decreases the risk of malfunction.

Advantageously, the casing comprises a skirt, the pad of said other head being at least in part fitted in the skirt and in contact with the skirt.

It should be understood that the pad is fitted in the skirt while projecting from the skirt so as to be able to use said pad. The pad is in contact with the casing via the skirt of the casing. Advantageously, the skirt forms a single piece together with the casing. In a variant, at least a portion of the pad is blocked between the skirt and the support, whereby direct contact is provided between the skirt and the pad.

Advantageously, the tip includes at least one projection that co-operates with the body in the first and second positions of the tip.

Such a projection makes it possible to ensure that the tip remains in position when the manual device is used. In particular, the projection makes it possible to prevent the tip from moving relative to the body when pressing on the first or second head. In addition, in a variant, the projection also makes it possible to establish electrical contact between the tip and at least a portion of the body.

The same projection co-operating with the body both in the first position and in the second position, makes it possible to simplify the structure of the tip. This makes it possible to optimize manufacturing costs.

Advantageously, the body includes a first connector portion while the tip includes a second connector portion (or first second connector portion) co-operating with the first connector portion when the tip is mounted in the first position and another second connector portion (or second second connector portion) co-operating with the first connector portion when the tip is mounted in the second position.

It is thus understood that the connector for mounting the tip on the body includes a single first portion that is secured to the body, together with two second portions, that are preferably identical but distinct, making it possible to mount the tip in the first and second positions respectively. By way of example, the first portion and the two second portions form additional elements for a snap-fastening mechanism. Snap-fastening is a method of assembling two portions by engagement and elastic deformation (in general local deformation, e.g. of a tongue). When the two portions are engaged in the snap-fastening position, the portions generally return to their initial shape and no longer present any elastic deformation (or they present less elastic deformation). When the two portions are engaged with each other in the snap-fastening position, they co-operate with each other in such a manner as to oppose, or even block, relative movements of said portions in the release direction (the direction opposite the engagement direction). In the snap-fastening position, the two portions may further co-operate so as to oppose, or even block, their relative movements in the direction for extending their engagement, beyond the snap-fastening position. In another example, the first portion and the two second portions form complementary screw-fastener elements.

Advantageously, the body extends in an axial direction and presents a first distal end on which the tip is mounted.

It should be understood that when the tip includes a casing extending in an axial direction, the axial direction of the body and the axial direction of the tip are parallel. Preferentially, the body and the casing are coaxial in the axial direction. A longitudinal body (i.e. extending in an axial direction) is advantageously ergonomic for manipulating a tip for a capacitive screen.

Advantageously, the body presents a second distal end opposite to the first distal end, the second distal end presenting a writing tip or the equivalent.

For example, the writing tip or the equivalent is a ballpoint, a felt tip, a mechanical pencil tip, a rigid tip for a resistive screen, the tip of a punch, or the tip of any other manual device.

Thus, the manual device forms a "three-in-one device", the first end carrying the reversible tip while the second end presents a writing tip or the equivalent.

In yet another example, another reversible tip of the invention is mounted on the second distal end. The manual device thus forms a "four-in-one" device.

BRIEF DESCRIPTION OF THE DRAWINGS

The invention and its advantages can be better understood on reading the detailed description of various embodiments of the invention given as non-limiting examples. The description refers to the accompanying sheets of figures, in which.

DETAILED DESCRIPTION OF THE DISCLOSURE

Figure 1:
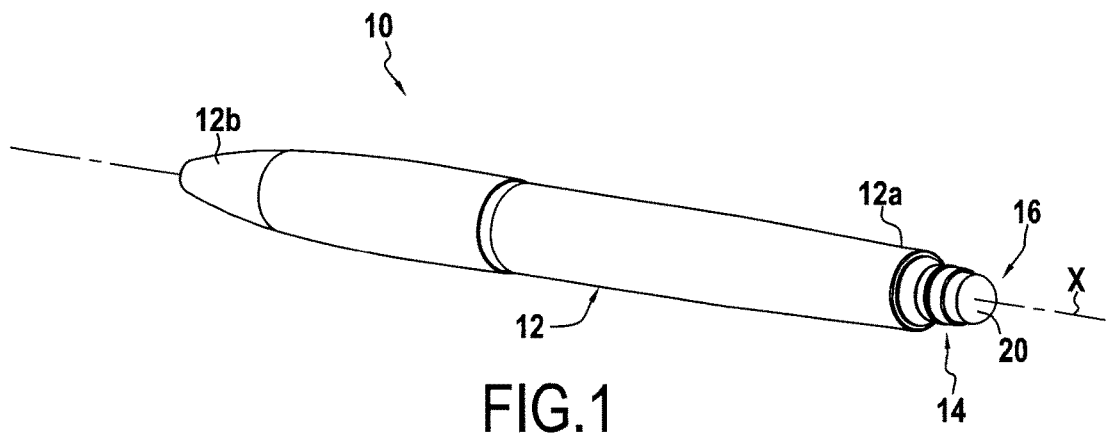
FIG. 1 shows a manual device in a first embodiment, seen in perspective, the tip being mounted on the body in a first position.
Figure 2:
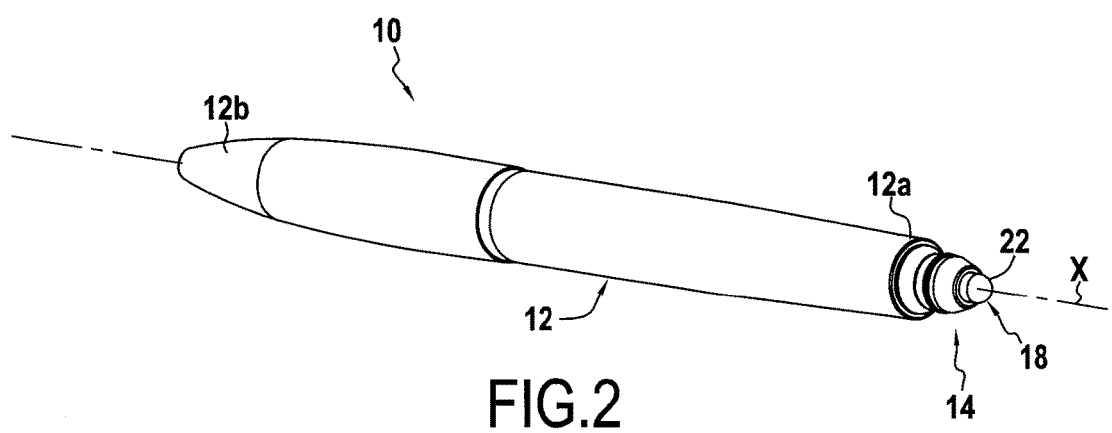
FIG. 2 shows the FIG. 2 manual device, the tip being mounted on the body in a second position.
Figure 3:
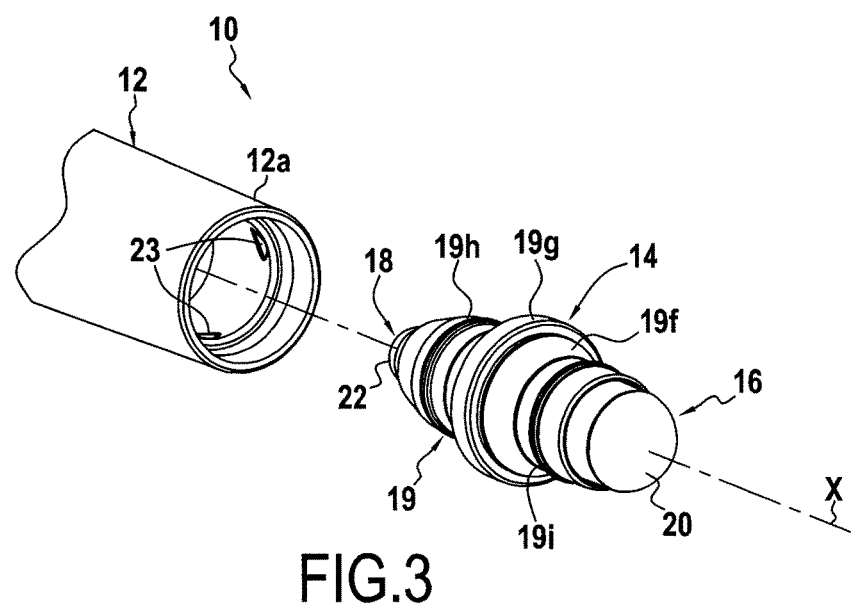
FIG. 3 is a detailed view of the distal end of the manual device carrying the tip, the tip being disconnected.
Figure 4:
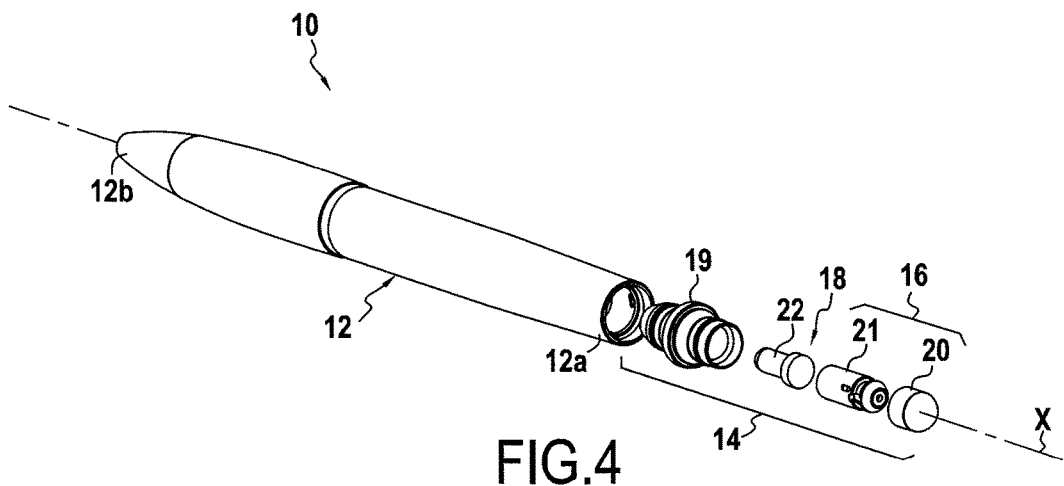
FIG. 4 shows the same view as FIG. 1 in which the tip is shown in an exploded view.
Figure 5:
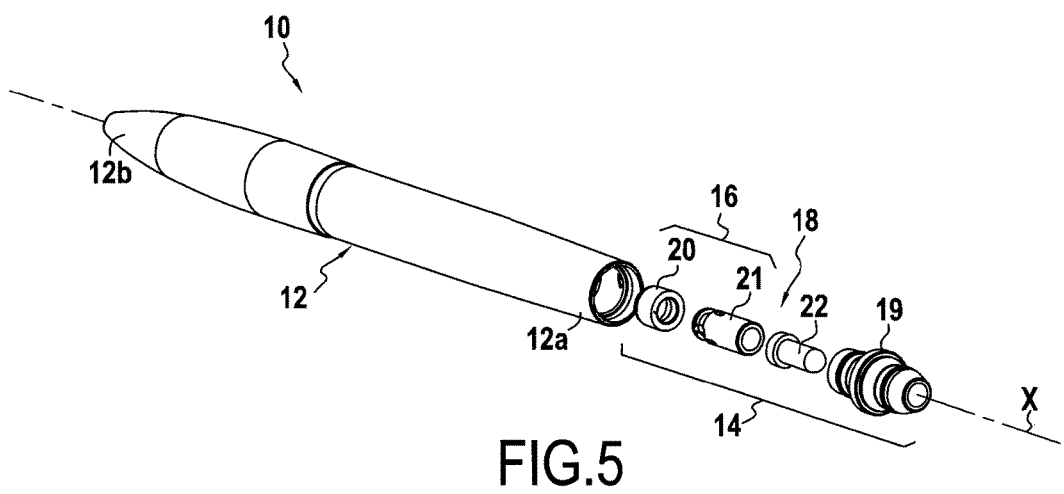
FIG. 5 shows the same view as FIG. 2 in which the tip is shown in an exploded view.
Figure 6:
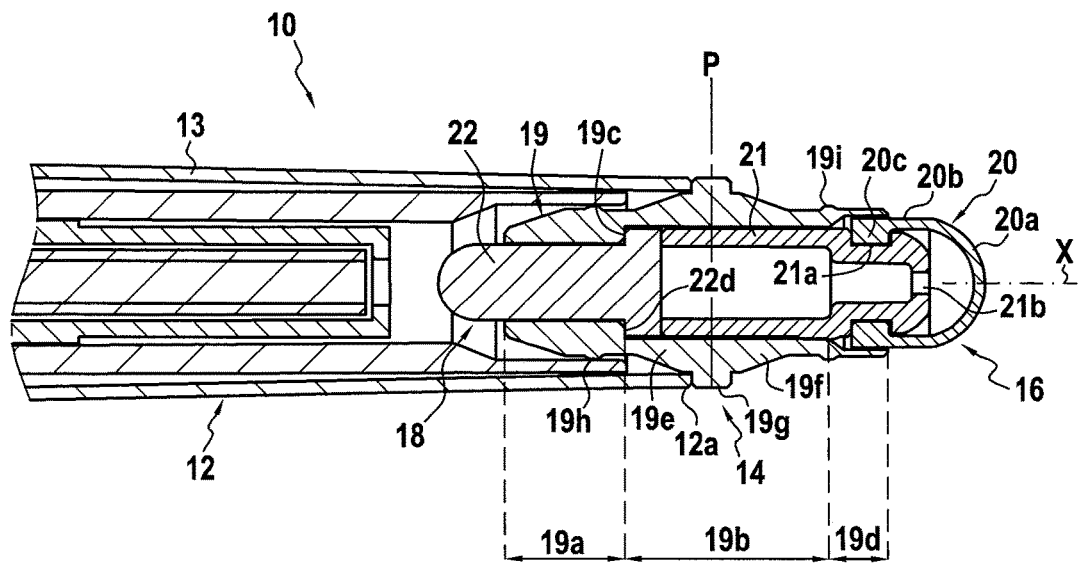
FIG. 6 is a partial axial section view of the manual device, the tip being mounted in the first position.
Figure 7:
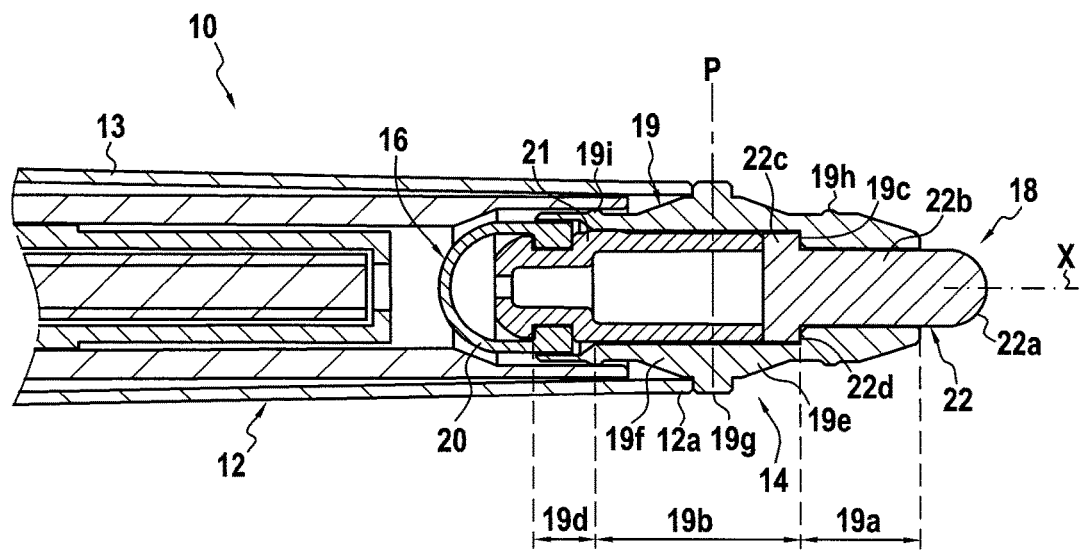
FIG. 7 is a partial axial section view of the manual device, the tip being mounted in the second position.

A first embodiment of a manual device is described with reference to FIGS. 1 to 7. In FIGS. 1 and 6, the tip is mounted in the first position whereas in FIGS. 2 and 7 the tip is mounted in the second position. However, this labelling of a mounting position of the tip as the "first" or "second" position is completely arbitrary. Thus, it could be considered that FIGS. 1 and 6 show the tip in the second position while FIGS. 2 and 7 show the tip in the first position. In which circumstances, the labeling of the heads, pads, etc. should also be reversed relative to the description given below.

The manual device 10 comprises a body 12 extending longitudinally in an axial direction X, the body 12 presenting a first distal end 12a and a second distal end 12b that is opposite to the first distal end 12a in the axial direction X.

The first distal end 12a is provided with a reversible tip 14 while the second distal end 12b is provided with a writing tip (not shown), in this example, a ballpoint pen. Naturally, in a variant, the writing tip may be a mechanical pencil tip, a felt tip, or the equivalent.

The reversible tip 14 extends longitudinally in the axial direction X and includes a first head 16, and a second head 18 that is opposite the first head 16 in the axial direction X. The tip 14 comprises a casing 19 made of metal, in this example aluminum, in which the first head 16 and the second head 18 are fitted.

In the first position of the tip 14, the first head 16 projects from the body 12 while the second head 18 is stored in the body 12. Conversely, in the second position of the tip 14, in FIGS. 2, 5, and 7, the second head 18 projects from the body 12 while the first head 16 is stored in the body 12.

The first head 16 comprises a first pad 20 for a capacitive screen, while the second head 18 comprises a second pad 22 for a capacitive screen. The first pad 20 and the second pad 22 are made from conductive material, in this example out of silicon filled with particles of carbon black. In a variant and by way of example, the second head carries an eraser rather than a second pad, said eraser being suitable for presenting the same shape as the second pad 22.

The first pad 20 is mounted on a support 21. The first pad 20 presents a distal end 20a for co-operating with a capacitive screen, this end 20a in this example being substantially in the form of a hollow hemisphere. The end 20a extends a fastener portion 20b that is substantially in the form of a hollow cylinder. The fastener portion 20b has a collar 20c arranged in the vicinity of the free end of the fastener portion 20b, on the inside of the fastener portion 20b. The collar 20c co-operates by snap-fastening with an annular groove 21a formed in the support 21.

The support 21 presents a through hole 21b in the longitudinal direction X so as to form a vent for balancing the pressure inside the volume formed between the first pad 20 and the support 21, and the pressure outside said volume.

The second pad 22 presents a distal end 22a for co-operating with a capacitive screen, this end 22a in this example being substantially in the form of a solid hemisphere. The end 22a extends a fastener portion 22b that is substantially in the form of a solid cylinder. This fastener portion 22b extends axially between the end 22a and a base 22c. The base 22c forms an annular collar projecting radially outwards relative to the fastener portion 22b. The face of the collar of the base 22c arranged on the end of the fastener portion 22b forms a shoulder 22d.

In this example, the casing 19 extends in the axial direction X and presents symmetry in rotation about the axis X. The casing 19 presents a first axial casing portion 19a and a second axial casing portion 19b. A first shoulder 19c axially defines the first portion 19a and the second portion 19b. The axial first and second portions 19a and 19b are adjacent. The inside diameter of the axial first portion 19a is less than the inside diameter of the axial second portion 19b. At the other end of the axial first portion 19a in the axial direction X, the casing 19 presents a skirt 19d adjacent to the axial second portion 19b. Thus, in the axial direction X, the casing presents in succession: the axial first portion 19a; the axial second portion 19b; and the skirt 19d. The inside diameter of the second portion 19b is less than the inside diameter of the skirt 19d.

The second head 18 extends in the axial first casing portion 19a and it co-operates axially with the first shoulder 19c. The second head 18 projects from the axial first casing portion 19a. In particular, in this example, the base 22c, and more particularly the shoulder 22d, co-operates axially with the first shoulder 19c of the casing 19. The second pad 22, and more particularly the fastener portion 22b, extends axially in the axial first portion 19a, while the distal end 22a of the second pad projects from the first axial portion 19a, and therefore from the casing 19.

The support 21 is fitted by force in the axial second portion 19b of the casing 19 and blocks the base 22c and causes said base 22c to press against the first shoulder 19c. Since the second pad 22 and the casing 19 are made from conductive materials, this mounting ensures there is electrical contact between the casing 19 and the second pad 22 caused at least by the shoulder 22d co-operating with the first shoulder 19c by pressing thereagainst.

The first pad 20 is fastened to the support 21 by means of the collar 20c engaged in the groove 21a. The portion of the support 21 presenting said groove 21a extends in the skirt 19d from the casing 19 in such a manner that the fastener portion 20b of the first pad 20 is axially blocked between the support 21 and the skirt 19d. Thus, the collar 20c is blocked inside the groove 21a, and that locks mounting of the first pad 20 on the support 21. Naturally, the distal end 20a of the first pad projects axially from the skirt 19c, and therefore from the casing 19.

The skirt 19d is in contact with the fastener portion 20b of the first pad 20. Since the casing 19 and the first pad 20 are conductive, this configuration ensures there is electrical contact between the casing 19 and the first pad 20.

In this example, the support 21 is made of insulating material. In a variant, the support 21 is made of conductive material and also contributes to providing electrical contact between the first pad 20 and the casing 19, although that is not its main function.

On its outer periphery, the casing 19 presents contact members 19e and 19f, configured to form electrical contact between the tip 19 and the body 12, in this example with the prehension portion 13 of the body 12. The contact members 19e and 19f form a single part with the casing 19 and they are conductive, being made of metal, and more particularly of aluminum. The casing 19 and the contact members 19e and 19f thus form a single part made of a single material. The prehension portion 13 is conductive, in this example made of metal, and more particularly of aluminum.

More particularly, the contact member 19e is configured to provide electrical contact between the prehension portion and the tip 14 when the tip is mounted in the first position. The contact member 19f is configured to provide electrical contact between the prehension portion and the tip 14 when the tip is mounted in the second position. In this example, the contact members 19e and 19f are symmetrical relative to a radial plane P of the tip 14. In this example the contact members 19e and 19f are frustoconical in shape, flaring towards the first head 16 and the second head 18 respectively. The greatest diameter of each of these frustoconical shapes is substantially equal to the inside diameter of the prehension portion 13. Thus, when the tip 14 is in the first position, the contact member 19e is in electrical contact with the prehension portion 13, whereas when the tip 14 is in the second position, the contact member 19f is in electrical contact with the prehension portion 13.

Thus, since the pads 20 and 22 are mounted on the casing 19, the pads 20 and 22 are in electrical contact with the casing 19, while the casing 19 is in electrical contact with at least a portion of the body 12, namely with the prehension portion 13. Consequently, in the first position of the tip 14, the first pad 16 is in electrical contact with the prehension portion 13, whereas in the second position of the tip 14, the second pad 18 is in electrical contact with the prehension portion 13. In this example, the casing 19 and the contact members 19e and 19f form a single part made from a single conductive material, the two pads 20 and 22 are in electrical contact with the prehension portion whatever the position of the tip.

It should be observed that the frustoconical shape of the contact members 19e and 19f also makes it possible to facilitate insertion and guidance of the tip 14 while it is being assembled to the body 12.

In addition, the contact members 19e and 19f are separated axially by a stop collar 19g projecting radially towards the outside of the tip 14. This stop collar 19g co-operates in abutment with the body 12, and more particularly with the prehension portion 13, in the first and second positions of the tip 14. This stop collar 19g makes it possible to limit the engagement of the tip 14 in the body 12 in order to avoid any deterioration. In addition, this collar 19g forms a single part with the casing 19, and is therefore also conductive. Thus, this stop collar 19g also contributes to providing electrical contact between the casing 19 and the prehension portion 13.

On its outer periphery, the casing 19 presents annular snap-fastening portions in relief 19h and 19i co-operating with the complementary portions in relief 23 of the body 12 (cf. FIG. 3) when the tip 14 is mounted in the first position or in the second position. The annular snap-fastening portions in relief 19h and 19i form a single part with the casing 19. Thus, the complementary portions in relief 23 form a first connector portion while the annular portion in relief 19h forms a second connector portion that co-operates with the portions in relief 23 when the tip is mounted in the first position and the annular portion in relief 19i forms another second connector portion co-operating with the portions in relief 23 when the tip is mounted in the second position. Thus, because the tip 14 is mounted on body 12 by means of snap-fastening, the user can easily remove the tip 14 from the body 12, and can also easily put it back it in the desired position.

Although the present invention is described with reference to specific embodiments, it is clear that modifications and changes may be made to those embodiments without going beyond the general ambit of the invention as defined by the claims. In particular, individual characteristics of the various embodiments that are shown and/or described may be combined to make additional embodiments. Consequently, the description and the drawings should be considered in a sense that is illustrative rather than restrictive.

In particular, the structure of the first head is transposable to the second head, while the structure of the second head is transposable to the first head.

The invention claimed is:

1. A manual device comprising:
   a body;
   at least one reversible tip mounted on the body, the reversible tip comprising a first head and a second head opposite to the first head, the reversible tip being configured to be mounted on the body in a first position in which the first head projects from the body while the second head is stored inside the body or in a second position in which the second head projects from the body while the first head is stored inside the body, the first head comprising a first pad for a capacitive screen and the second head comprising a second pad for a capacitive screen, the first pad being different from the second pad, the reversible tip further comprising at least one contact member configured to form an electrical contact between the reversible tip and at least a portion of the body when the reversible tip is mounted in the first position and at least another contact member configured to form an electrical contact between the reversible tip and at least a portion of the body when the reversible tip is mounted in the second position, wherein the reversible tip comprises at least a conductive casing in which the first head or the second head is fitted.

2. The device according to claim 1, wherein the first pad is in electrical contact with at least a portion of the body when the reversible tip is mounted in the first position.

3. The device according to claim 2, wherein the second pad is in electrical contact with at least a portion of the body when the reversible tip is mounted in the second position.

4. The device according to claim 1, wherein the conductive casing extends in an axial direction, further comprising a selected head selected from the first head and the second head that co-operates with a first shoulder axially defining a first axial casing portion and a second axial casing portion, said selected head extending in the first axial casing portion by projecting from the conductive casing.

5. The device according to claim 4, wherein said selected head includes a base forming a shoulder co-operating with the first shoulder to establish electrical contact between said selected head and the conductive casing.

6. The device according to claim 5, wherein the base is blocked between the first shoulder and the other head selected from the first head and the second head.

7. The device according to claim 4, wherein the other head selected from the first head and the second head includes a support and the first pad or the second pad for capacitive screens, the first pad or the second pad being mounted on the support to be in electrical contact with the conductive casing.

8. The device according to claim 7, wherein the conductive casing comprises a skirt, and wherein the the first pad or the second pad of the other head is at least in part fitted in the skirt and in contact with the skirt.

9. The device according to claim 1, wherein the body extends in an axial direction and presents a first distal end on which the reversible tip is mounted.

10. The device according to claim 9, wherein the body presents a second distal end opposite to the first distal end, and wherein the second distal end presents a writing tip or the equivalent.

* * * * *